United States Patent [19]
Alferness

[11] 3,842,844
[45] Oct. 22, 1974

[54] ELECTROMEDICAL PULSE GENERATOR WITH CONTINUOUS PULSE WIDTH ADJUSTMENT CIRCUITRY

[75] Inventor: Clifton A. Alferness, Minneapolis, Minn.

[73] Assignee: Medtronic, Inc., Minneapolis, Minn.

[22] Filed: June 30, 1972

[21] Appl. No.: 267,935

[52] U.S. Cl. ............. 128/422, 128/419 P, 331/111
[51] Int. Cl. .............................................. A61n 1/36
[58] Field of Search ................ 128/419 P, 421, 422; 331/108 A, 111

[56] References Cited
UNITED STATES PATENTS
3,746,005 7/1972 Thaler et al. .................... 128/419 P

*Primary Examiner*—William E. Kamm
*Attorney, Agent, or Firm*—Lew Schwartz; Wayne A. Sivertson

[57] ABSTRACT

A pulse generator for providing timed pulses, such as in a cardiac pacemaker, having a timing circuit comprising a capacitor which determines pulse width, and having a reference voltage node and a substantially constant voltage feedback node, apparatus for substantially increasing pulse width in response to decreases in the reference voltage comprising a first resistance connecting the capacitor to the reference node and a second resistance connecting the capacitor to the feedback node. This voltage divider provided in the RC circuit will increase the time constant of the circuit to a new fixed value and make it respond to each decrease in reference voltage in a manner to keep the energy of the pulses from the pulse generator above a predetermined energy level over a wide range of voltage decreases.

4 Claims, 3 Drawing Figures

ELECTROMEDICAL PULSE GENERATOR WITH CONTINUOUS PULSE WIDTH ADJUSTMENT CIRCUITRY

BACKGROUND OF THE INVENTION

Cardiac pacemakers, and their usages to control heart blockage, are well known to those skilled in the art. The most common form of cardiac pacemaker is the implantable battery operated type. As with all battery operated devices, it is well known that continued use will cause a depletion of the battery power available to provide voltage to the operating circuitry. In cardiac pacemakers, such a depletion of battery power will eventually cause the stimulation pulses to the heart to be of insufficient energy to cause the required cardiac response. It therefore becomes axiomatic that any system which can decrease battery depletion and/or provide pulses of sufficient energy to stimulate the heart despite some battery depletion is of great value to those patients in which the devices are implanted.

It has long been known that the capability of a stimulation pulse to achieve a response in the heart is related to the total energy of the pulse. Therefore, adjustable pulse width pacemakers have existed in the prior art to provide a width adjustment for varying the total energy delivered to a heart at a specified voltage level. Some cardiac pacemakers will automatically adjust pulse width at a predetermined voltage level, such as the device described in the application by Frank R. Walmsley, Ser. No. 217,492, filed Jan. 13, 1972 and assigned to the assignee of this invention. In that invention there is provided circuitry that will recognize when the original voltage level has decreased to a predetermined point (for example the loss of an entire cell of a plurality of battery cells) and will at that point make a single adjustment in the pulse width to provide greater energy to the heart at the reduced voltage level. At the same time, the circuitry of that invention will provide the pulses at a rate different from the original rate so that the patient is made aware of the fact that his batteries are failing.

One of the disadvantages of the above described cardiac stimulation circuitry is that there is only a single point at which pulse width is changed, and therefore the total energy of the output pulse may decrease to a point below the safety margin of the individual before the original voltage depletes to the point of decreased voltage at which the change in pulse width is made. It is known in the art that the life sustaining characteristic of heart response versus stimulation energy varies greatly from patient to patient.

To overcome the disadvantages of prior art adjustable pulse width stimulators, the apparatus of this invention provides circuitry which will automatically and continuously vary the stimulation pulse width in response to each decrease in battery voltage.

SUMMARY OF THE INVENTION

Briefly described, the apparatus of this invention affects the pulse width timing capacitor of a cardiac pacemaker pulse generating circuit by providing a resistive voltage divider in the RC timing circuit that determines the pulse width output of the generator. Such a pulse generator is provided with a substantially constant voltage point which provides feedback through the pulse width determining capacitor. A reference voltage point is also present, which will increase and decrease according to an increase or decrease in the battery voltage. In the prior art, the pulse width determining capacitor has one plate directly connected to the feedback junction and another plate connected through a resistor to the reference voltage. The RC circuit of the prior art thus has a fixed time constant which will cause only a minor change in pulse width over a greatly decreasing range of battery voltage. The apparatus of this invention creates a voltage divider by inserting further resistance between the one plate of the capacitor and the feedback junction. The thus increased time constant of the overall RC circuit will result in a substantial pulse width increase for all decreases in the battery voltage felt at the reference voltage junction. Further, because a portion of the feedback voltage will be dropped across the inserted resistance portion of the voltage divider, by proper selection of the added resistance one can commence with the same pulse width as is provided in the prior art circuitry. Thus the apparatus of this invention will provide substantial increases in pulse width in response to decreases in battery voltage. The advantageous result is to keep the total energy of the output pulse above a predetermined level over a specific range of decreasing voltage.

DESCRIPTION OF THE PREFERRED EMBODIMENT

Figure 1:
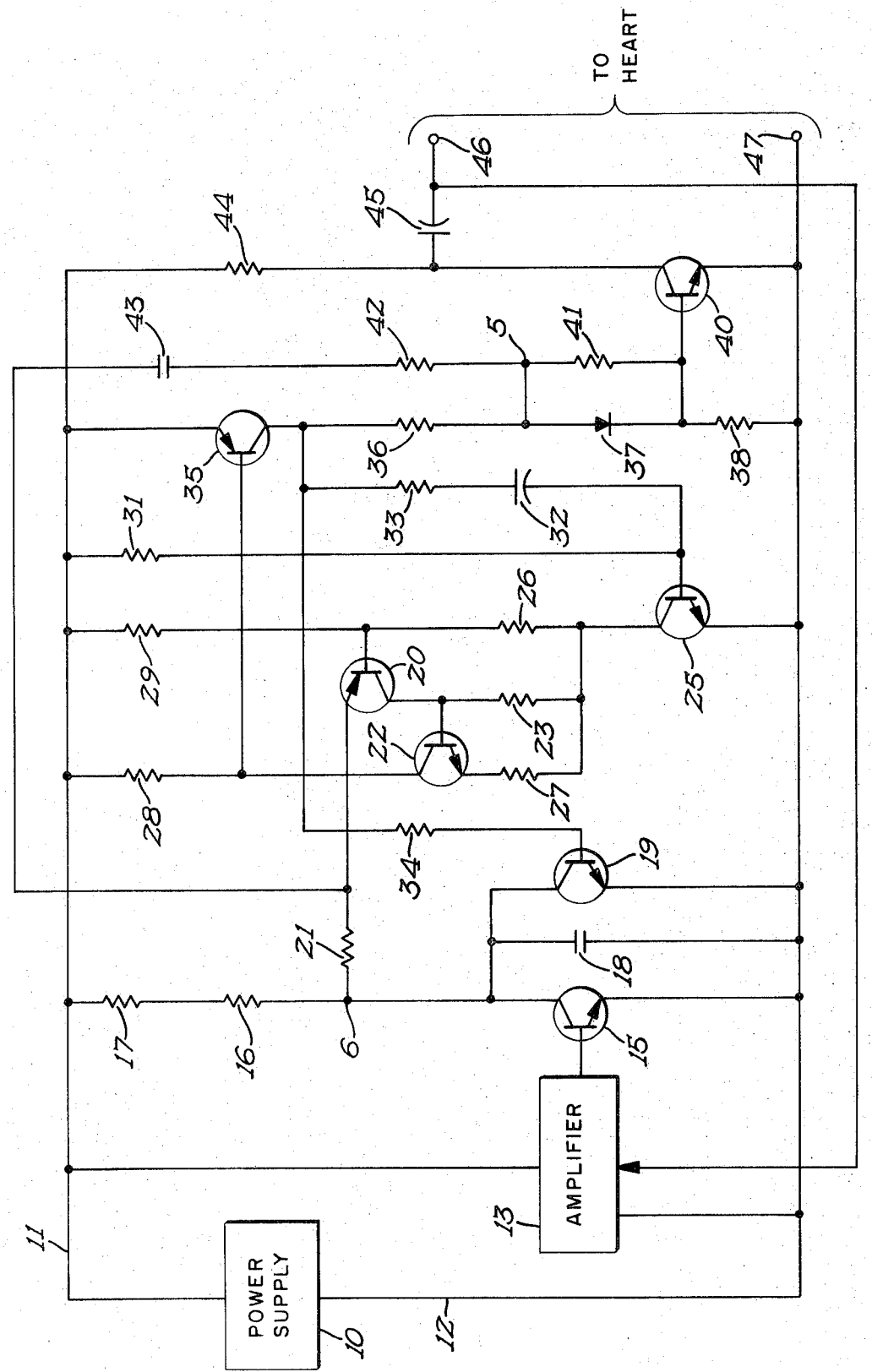
FIG. 1 is a partial block diagram and circuit schematic of a preferred embodiment of the apparatus of this invention.

Referring first to FIG. 1, there is shown in partial block diagram and schematic form a demand cardiac pacemaker which incorporates the apparatus of this invention. Such demand pacemakers are well known to those skilled in the art and only that portion of the circuitry relevant to the subject invention will be described in detail below.

In FIG. 1 there is shown a power supply 10, which in an implantable device will comprise a plurality of battery cells. Supply 10 is connected to a first voltage bus 11 and a second voltage bus 12. Also shown is a sensing circuit and amplifier 13 connected across buses 11 and 12. The output of amplifier 13 is connected to the base of a transistor 15. The emitter of transistor 15 is connected to bus 12, and the collector of transistor 15 is connected through a resistor 16 and a resistor 17 to bus 11. The collector of transistor 15 is also connected through a capacitor 18 to bus 12, and to the collector of a transistor 19. Transistor 19 has its emitter connected to bus 12.

A transistor 20 is shown having its emitter connected through a resistor 21 to the collector of transistor 15. The collector of transistor 20 is connected to the base of a transistor 22. The base of transistor 22 is connected through a resistor 23 to the ocllector of a transistor 25. The collector of transistor 25 is also connected through a resistor 26 to the base of transistor 20 and through a resistor 27 to the emitter of transistor 22. The emitter of transistor 25 is connected to bus 12. The base of transistor 20 is connected through a resistor 29 to bus 11, and the collector of transistor 22 is connected through a resistor 28 to bus 11. The base of transistor 25 is connected through a resistor 31 to bus 11, and through a serial combination of a capacitor 32, a resistor 33 and a resistor 34 to the base of transistor 19.

A transistor 35 has its emitter connected to bus 11, its base connected to the collector of transistor 22, and its collector connected to a junction between resistors 33 and 34. The collector of transistor 35 is also connected through a resistor 36, a diode 37 and a resistor 38 to bus 12. A transistor 40 has its base connected to a junction between diode 37 and resistor 38. The base of transistor 40 is also connected through a serial combination of a resistor 41, a resistor 42 and a capacitor 43 to the emitter of transistor 20. A feedback junction 5 between resistors 41 and 42 is connected to a junction between resistor 36 and diode 37. A reference voltage junction 6 comprises the junction between the collector of transistor 15 and resistor 16. Transistor 40 has its emitter connected to bus 12 and to an output terminal 47. The collector of transistor 40 is connected through a resistor 44 to bus 11. A capacitor 45 is connected between the collector of transistor 40 and a terminal 46. Terminals 46 and 47 are adapted to be connected to a heart. Terminal 46 is connected to amplifier 13 for providing sensing of heartbeats by sensing circuitry and amplifier 13.

Reference is again made to FIG. 1 for a description of the operation of the apparatus of this invention. As is well known to those skilled in the art, terminals 46 and 47 are adapted to be connected to electrodes placed at the heart which will both provide stimulation pulses and receive heart response signals. Assuming the apparatus of FIG. 1 is connected to a heart, power supply 10 will be providing power to the entire circuitry including transistors 20, 22 and 35, which in combination with the feedback circuit including capacitor 43 comprise an astable multivibrator or pulse generator.

When heartbeats occur, the resulting electrical signal will be felt between terminals 46 and 47 and be fed back to amplifier 13 where they will be sensed and amplified. On the sensing of a heartbeat, a signal is provided from amplifier 13 to turn on transistor 15 and discharge capacitor 18. This prevents the turn on of the pulse generator.

Should no heartbeat be sensed, capacitor 18 will not be reset and will eventually charge through resistors 16 and 17 to a level at which it will turn on transistor 20. The turn on of transistor 20 will be felt at the base of transistor 22 causing it to switch on, which will in turn be felt on the base of transistor 35 to turn it on. When transistor 35 turns on it will provide a signal to switch on transistor 19. When transistor 19 turns on it will discharge capacitor 18, however, the pulse generator will remian on due to the feedback loop including capacitor 43 connected to the emitter of transistor 20. The current flow through diode 37, due to the characteristics of the diode, will provide a substantially constant feedback voltage at junction 5. This feedback voltage is combined with the reference voltage present at junction 6 to effect the discharge time of capacitor 43. When capacitor 43 has discharged transistor 20 will turn off, thus turning off transistors 22, 35 and 19.

Transistor 25 and its associated circuitry resistor 31, capacitor 32 and resistor 33 are present in the circuit to provide a rate limitation in a manner well known to those skilled in the art.

Transistor 40 operates as a pulse output transistor which is turned on at the time transistor 35 switches on to provide the output pulse across terminals 46 and 47.

From the above description it is apparent that the time constant of the RC serial network comprising resistor 42, capacitor 43 and resistor 21 are determinative of the pulse width provided by the pulse generator of the circuitry of FIG. 1. In the prior art, resistor 42 is not present, and the time constant of the circuit is determined solely by capacitor 43 and resistor 21. As node 5 is of a substantially constant feedback voltage, it is necessary to select a time constant of a smaller magnitude to achieve the desired beginning pulse width for full battery power. As the battery power decreases, the voltage at node 6 will decrease. However, because of the lower magnitude time constant the pulse width determined by the RC circuit including capacitor 43 will not vary significantly. Thus, as the voltage level decreases without substantial increase in pulse width the total energy of the output pulse will also decrease, as is shown graphically in FIG. 3. As described above, this could lead to a dangerous situation for various patients.

The apparatus of this invention solves this problem by the insertion of resistor 42 as shown in FIG. 1. By inserting this resistor between capacitor 43 and junction 5 a voltage divider effect is created which enables the RC circuit including capacitor 43 to have a greater fixed time constant. A portion of feedback voltage 5 is dropped across resistor 42 so that the beginning pulse width at full battery supply can be the same as that of the prior art circuitry, despite the greater time constant. Thus, with the significantly increased time constant of the feedback circuit including capacitor 43, each decrease in voltage of power supply 10, which is felt at reference voltage junction 6, will result in a substantial increase in pulse width. The desired result, by proper selection of resistor 42, is that the total energy of the output pulse will remain above a predetermined level over a wide range of decreasing voltage, as can be seen in FIG. 3.

It should be noted that the same affect is not available by simply increasing the time constant by increasing the value of resistor 21. This would not drop a portion of feedback voltage 5 and therefore one could not achieve the original pulse width for the starting battery voltage without decreasing the voltage at junction 5. A decrease in the voltage at junction 5 has proven by test to result in an unreliable circuit and to give less than a substantial pulse width increase over a range of decreasing battery voltage.

Figure 2:
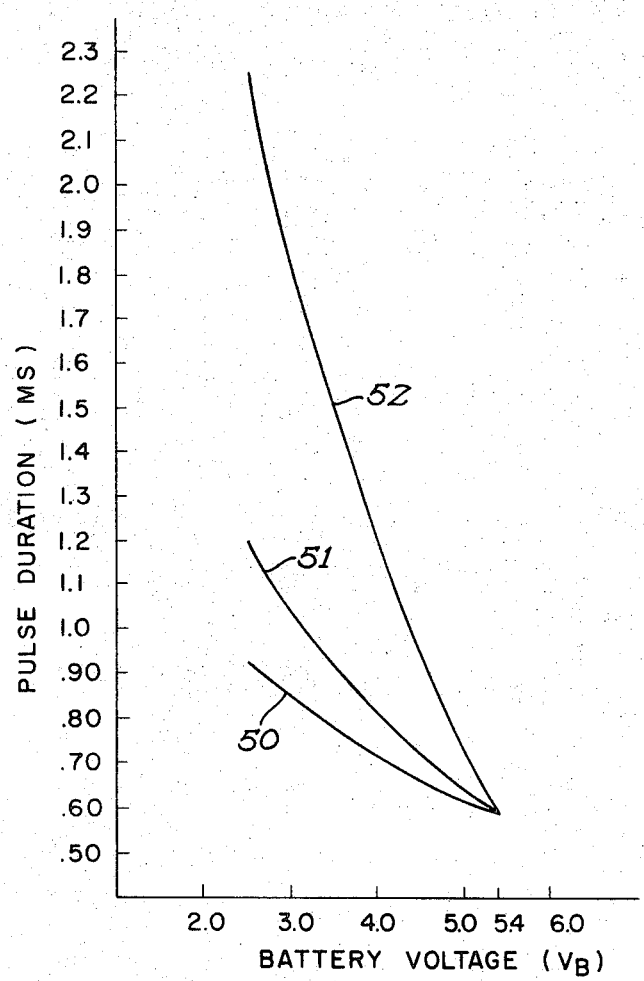
FIG. 2 is a graph of pulse duration versus battery voltage for prior art configurations and for the embodiment of this invention.
Figure 3:
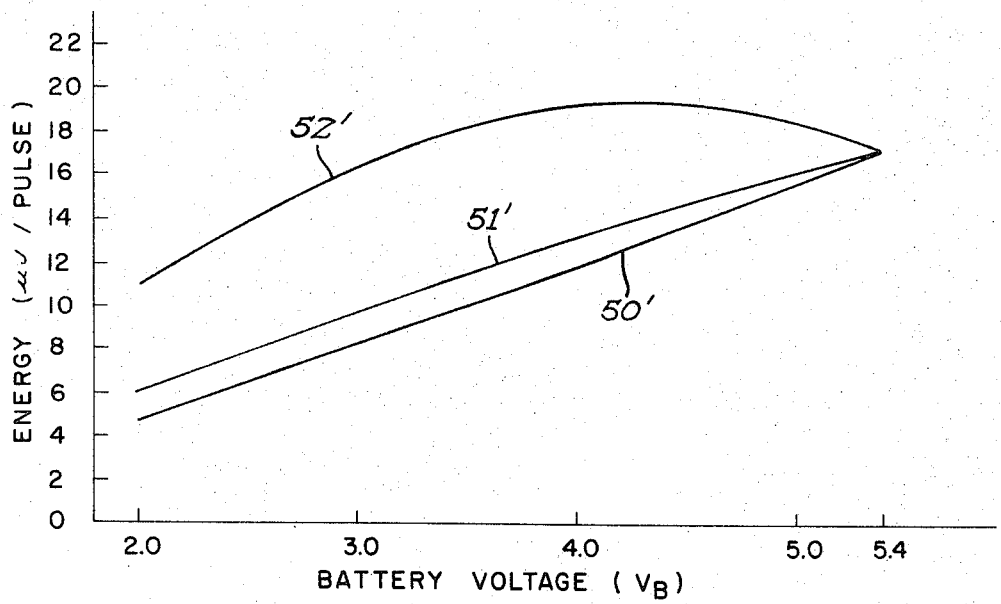
FIG. 3 is a graph of energy versus battery voltage for prior art configurations and the apparatus of this invention.

For a better understanding of the advantages of the apparatus of this invention reference is made to FIGS. 2 and 3. FIG. 2 is a graph of battery voltage versus pulse duration (pulse width). Three curves are shown each commencing at the same maximum battery voltage and each showing the change in pulse width relative to decreasing battery voltage. Curve 50 is a prior art configuration not using the apparatus of this invention. It is apparent that there is but a slight increase in pulse duration over a wide range of decrease in battery voltage. Curve 51 is a curve utilizing the apparatus of this invention without a major increase in the time constant of the feedback network including capacitor 43. Here it can be seen that the insertion of any resistance at resistor 42 will cause a more significant change in pulse duration for decreasing battery voltage. Curve 52 is the curve for the preferred embodiment of the apparatus of this invention where resistor 42 has been selected to provide a substantial pulse duration or pulse width increase over a range of decreasing battery voltage.

A comparison of FIG. 2 with that of FIG. 3 will show the output pulse energy levels related to the changing pulse width. FIG. 3 is a graph of battery voltage versus output energy. Here it can be seen that the prior art configuration indicated by the graph 50' provides an immediately decreasing energy level as battery voltage decreases. The decrease in energy of curve 51' is slightly less drastic than that of graph 50', but is still an undesirable decrease of output energy in response to decreasing battery voltage. Curve 52' shows the desired energy versus battery voltage curve provided by the preferred embodiment of the apparatus of this invention. It becomes apparent that by substantially increasing the pulse width as the battery voltage decreases the apparatus of this invention keeps the output energy level above a predetermined level over a wide range of decreasing battery voltage, thus preserving the patient's safety margin.

From the graphs of FIGS. 2 and 3, it will also be apparent that with the apparatus of the preferred embodiment of this invention the pulse width is being continuously monitored and changed as the battery voltage decreases.

From the above description it is apparent that the apparatus of this invention provides an electrical medical system capable of continuously adjusting the pulse width of output stimulating pulses in proportion to decreases in supply voltage to thus maintain the total energy of the stimulation pulses above a predetermined level over a range of decreasing supply voltage levels. Thus the apparatus of this invention provides a safety margin to the patient over a wide range of decreasing battery power. Further, the apparatus of this invention results in decreased battery depletion as it is not necessary to set in an original pulse width greater than that needed at full battery power to compensate for future battery voltage decreases. By making its own adjustment to battery loss, the apparatus of this invention eliminates the unnecessary use of energy while assuring that sufficient energy for stimulation will be present.

What is claimed is:

1. In electrical medical apparatus including pulse generator means adapted to provide stimulation pulses to means adapted to be connected to a body, and including power supply means for providing voltage to the pulse generator means, the improvement comprising: pulse width timing circuit means connected to the pulse generator means; the pulse width timing circuit means including fixed time constant means; and means connected to the timing circuit means for substantially increasing the pulse width of the stimulation pulses in response to decreases in voltage from the power supply means, to maintain the total energy of the stimulation pulses above a predetermined level over a range of decreasing voltage levels.

2. The apparatus of claim 1 in which the means for substantially increasing the pulse width includes: a reference voltage node means in the pulse generator and means connecting the reference voltage node means to the power supply means; a feedback voltage node means in the pulse generator and means connected to the feedback voltage node means for maintaining it at a substantially constant level; and the fixed time constant means including capacitance means having first and second plates, first impedance measn connecting the first plate to the reference voltage node means and second impedance means connecting the second plate to the feedback voltage node means.

3. The apparatus of claim 2 in which the first and second impedance means comprise resistors.

4. In electrical medical apparatus with pulse generator means for providing output pulses, the generator means comprising an RC timing circuit means for determining output pulse width, the generator means having a power supply and including means for producing a voltage reference junction and a substantially constant voltage feedback junction, the improvement for substantially increasing output pulse wideth in response to decreasing power supply voltage in which the timing circuit means comprises: a capacitor, first and second resistor means; means connecting the first resistor means between the capacitor and the reference junction; means connecting the second resistor means between the capacitor and the feedback junction; and the capacitor and the first resistor means comprising a fixed time constant means.

\* \* \* \* \*